(12) United States Patent
Sago et al.

(10) Patent No.: US 6,709,095 B2
(45) Date of Patent: Mar. 23, 2004

(54) WATER BASE PIGMENT INK FOR INK-JET RECORDING AND RECORDING APPARATUS

(75) Inventors: Hiromitsu Sago, Tokai (JP); Hideto Yamazaki, Nagoya (JP); Masashi Tsuda, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/246,013

(22) Filed: Sep. 18, 2002

(65) Prior Publication Data

US 2003/0058318 A1 Mar. 27, 2003

(30) Foreign Application Priority Data

Sep. 20, 2001 (JP) ........................................ 2001-286600

(51) Int. Cl.[7] .................................................. B41J 2/01
(52) U.S. Cl. ....................... 347/100; 347/96; 106/31.13
(58) Field of Search ................................. 347/101, 100, 347/96, 95; 106/31.13, 31.27, 31.6

(56) References Cited

U.S. PATENT DOCUMENTS

| | | | |
|---|---|---|---|
| 5,016,028 A | | 5/1991 | Temple |
| 5,618,338 A | * | 4/1997 | Kurabayashi et al. ........ 347/100 |
| 6,412,936 B1 | * | 7/2002 | Mafune et al. ............. 347/100 |

FOREIGN PATENT DOCUMENTS

| | | | |
|---|---|---|---|
| EP | 0-364-136 B1 | 8/1994 | |
| JP | 64-6074 | 1/1989 | |
| JP | 64-31881 | 2/1989 | |
| JP | 2-150355 | 6/1990 | |
| JP | 2000-345085 | * 12/2000 | ............... B41J/2/01 |
| JP | 2000-345086 | * 12/2000 | ............... B41J/2/01 |
| JP | 2001-055531 | * 2/2001 | ............... B41J/2/01 |

\* cited by examiner

Primary Examiner—Stephen D. Meier
Assistant Examiner—Manish Shah
(74) Attorney, Agent, or Firm—Reed Smith LLP

(57) ABSTRACT

An ink for ink-jet recording of the present invention includes water and a pigment. A total amount of free monovalent metal is not more than 300 ppm in the ink, and a total amount of free divalent or polyvalent metal is not more than 5 ppm in the ink. The ink may further comprise an antiseptic/fungicidal agent. The ink is excellent in dispersion stability of the pigment. The ink is stably discharged from a head over a long period without causing any clog-up at an ink flow passage and a nozzle of the head of a recording apparatus.

7 Claims, 3 Drawing Sheets

WATER BASE PIGMENT INK FOR INK-JET RECORDING AND RECORDING APPARATUS

BACKGROUND OF THE INVENTION

1. Field of the Invention

The present invention relates to a water base pigment ink for ink-jet recording based on the use of a pigment as a coloring agent, and an ink-jet recording apparatus which accommodates the same.

2. Description of the Related Art

In the ink-jet recording method, ink droplets are formed by means of a variety of ink discharge methods including, for example, the electrostatic attraction method, the method in which mechanical vibration or displacement is applied to the ink by using a piezoelectric element, and the method in which bubbles are generated by heating the ink to utilize the pressure generated thereby, and all or a part of the ink droplets are adhered to a recording objective such as paper to perform the recording.

Those known as the ink to be used for the ink-jet recording method as described above include those in which a variety of water-soluble dyes or pigments are dissolved or dispersed in water base or aqueous ink media each comprising water or a combination of water and a water-soluble organic solvent, for which development has been actively made. The water base ink as described above is required to have optimum performance characteristics in order to achieve the object. The requirement is, for example, as follows. That is, neither deposition nor aggregation occurs even when the ink is not used for a long period. No clog-up is caused at the tip of the head and the ink flow passage of the ink-jet printer. The printing quality is satisfactory, and the weather resistance is excellent. Further, for example, neither fungi nor microbes appear in the water base ink and on the image formed on the recording paper. When the dye and the pigment are compared with each other, the pigment is dispersed in the ink medium without being dissolved, while the dye is completely dissolved in the ink medium. Therefore, the dye ink hardly causes the clog-up in the ink flow passage and the tip of the head of the ink-jet printer as compared with the pigment ink. Further, the time-dependent stability of the dye ink is much more excellent than that of the pigment ink. For this reason, the dye ink was dominantly used for the ink for the ink-jet printer at one time. However, in recent years, the pigment such as carbon black has been used for the coloring agent in order to improve the image quality and the weather resistance of the recorded matter. In order to improve the time-dependent stability of the pigment ink, for example, a water base pigment ink, in which the dispersion performance of carbon black is improved by using a surfactant and/or a polymer dispersing agent, has been suggested in Japanese Patent Application Laid-open Nos. 64-60740 and 64-31881. In order to add the antiseptic/fungicidal performance to the ink, an antiseptic/fungicidal agent is generally added in a necessary amount.

However, even in the case of the water base pigment ink dispersed with the surfactant and/or the polymer dispersing agent as described above, the time-dependent stability of such an ink is inferior to that of the dye ink, when the water base pigment ink is compared with the water base dye ink. For example, the following case has been reported. That is, two types of inks, which differed in only coloring agent, i.e., pigment or dye, were prepared. After the preparation of the inks, the both inks were satisfactory in stability of the discharge from the head of an ink-jet printer. However, after the passage of a long period, i.e., after several months, only the water base pigment ink failed in stable discharge from the head of the ink-jet printer. When the water base pigment ink undergoes the passage of a long period, it is considered that the pigment is aggregated to increase the size of pigment particles, and the viscosity is increased, making it difficult to effect the stable discharge from the head of the ink-jet printer. The aggregation of the pigment occurs in different ways depending on the type and the dispersing mechanism of the pigment. In the case of the pigment based on the use of the surfactant and/or the polymer dispersing agent (non-self-dispersing type), even when the dispersion is once in a stable state owing to the adsorption of the surfactant and/or the polymer dispersing agent to the pigment surface, the surfactant and/or the polymer dispersing agent on the pigment surface is gradually liberated during the storage for a long period, or the action thereof is inhibited to lower the dispersion stability. Also in the case of the pigment of the self-dispersing type in which the pigment is spontaneously dispersed owing to the reforming treatment for the pigment surface without using the surfactant and/or the polymer dispersing agent, it has been confirmed that the action thereof is inhibited, and the dispersion stability is lowered.

SUMMARY OF THE INVENTION

The present invention has been made in order to solve the problems as described above, an object of which is to provide a water base pigment ink for ink-jet recording in which no pigment is aggregated even when the ink is left to stand for a long period, neither fungi nor microbes or the like appear, the clog-up scarcely occurs in an ink flow passage and a tip of a head of an ink-jet printer, and the storage stability is excellent, and a recording apparatus based on the use of the ink.

According to a first aspect of the present invention there is provided an ink for ink-jet recording comprising water; and a pigment; wherein a total amount of free monovalent metal is not more than 300 ppm in the ink, and a total amount of free divalent or polyvalent metal is not more than 5 ppm in the ink. As a result of diligent studies in order to solve the problem of the decrease in dispersion stability of the pigment as described in the section of the related art, it has been found out that the dispersion stability is affected by the amount of free metal ion in the water base pigment ink. Further, it has been also found out that even when the metal element is present at the inside of the pigment or on the surface of the pigment, the metal element does not affect the time-dependent stability of the ink, provided that the metal element is not liberated and ionized. The free metal ion functions to neutralize the negative electric charge generated on the pigment surface. Especially, in the case of the pigment of the self-dispersing type, if the free metal ion exist in an amount of not less than a certain amount, then the function to neutralize the electric charge on the pigment surface is enhanced, the repulsion exerted between the pigments is decreased, and the dispersion stability is lowered. Also in the case of the pigment of the non-self-dispersing type, even when the dispersion is once in a stable state owing to the adsorption of the surfactant and/or the polymer dispersing agent to the pigment surface, if the free metal ion exists in an amount of not less than a certain amount, then the surfactant and/or the dispersing agent on the pigment surface is gradually substituted with the metal ion, and the dispersion stability is lowered.

The ink of the present invention may further comprise an antiseptic/fungicidal agent. Many additives, which are commercially available as the antiseptic/fungicidal agent, contain metal ions. However, in the present invention, the amount of the metal ion in the ink is previously restricted as described above. Therefore, even when the antiseptic/fungicidal agent is added, the amount of the metal ion in the ink is not so excessive as to deteriorate the dispersion stability. Accordingly, in the present invention, it is possible to add a sufficient amount of the antiseptic/fungicidal agent, and thus the antiseptic/fungicidal performance of the ink is enhanced.

According to a second aspect of the present invention, there is provided an ink-jet recording apparatus comprising an ink-jet head; an ink tank which accommodates an ink to be supplied to the ink-jet head; and the ink of the present invention which is accommodated in the ink tank. The ink-jet recording apparatus of the present invention is based on the use of the ink of the present invention which is excellent in dispersion stability of the pigment. Therefore, no clog-up occurs in the ink flow passage and the nozzle of the head. It is possible to stably discharge the ink over a long period. The ink tank may be an ink container fixedly provided in the ink-jet recording apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
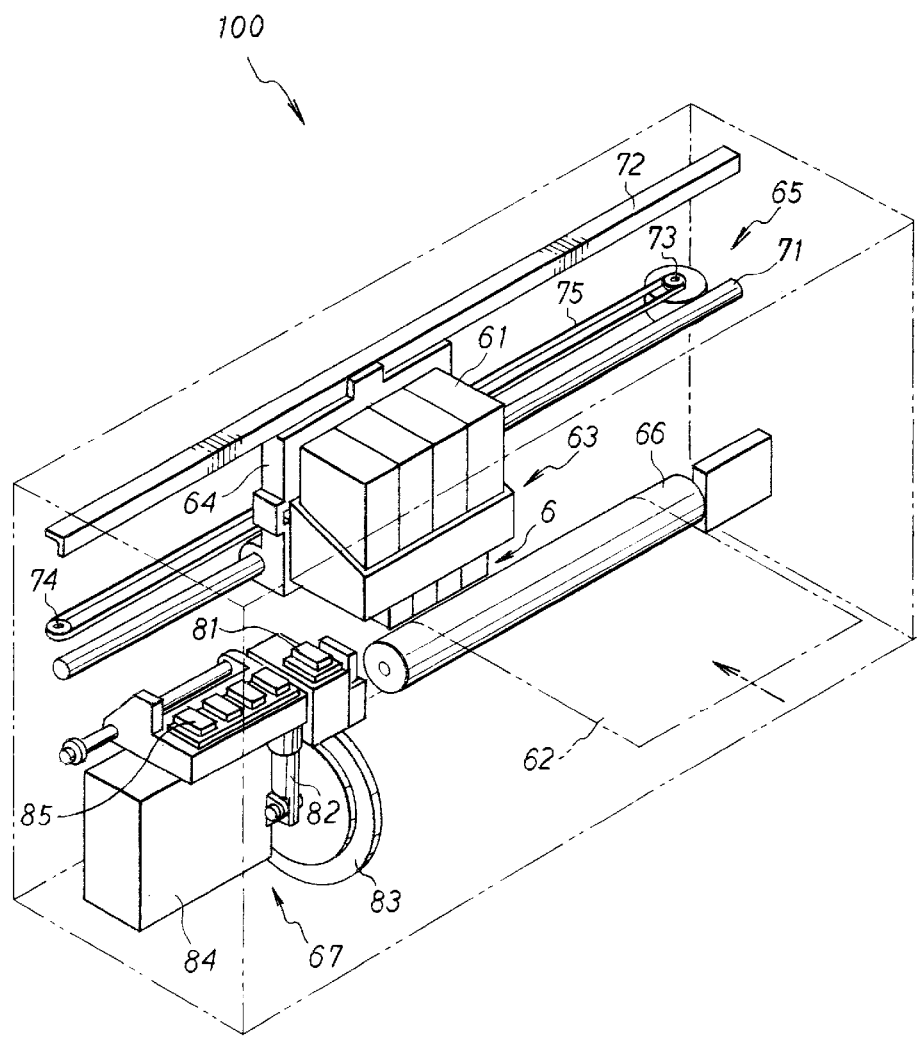
FIG. 1 is a perspective view showing a color ink-jet printer having an ink cartridge which contains ink prepared in examples of the invention.

The water base pigment ink for ink-jet recording of the present invention comprises at least water and the pigment. In the water base pigment ink for ink-jet recording, the concentration of the free monovalent metal ion is adjusted to be not more than 300 ppm in total amount in the ink, and the concentration of the free divalent or polyvalent metal ion is adjusted to be not more than 5 ppm in total amount in the ink. The water base pigment ink for ink-jet recording of the present invention further comprises the antiseptic/fungicidal agent, in which the concentrations of the metal ions are adjusted to be not more than the above.

The quantitative measurement of the metal ion can be carried out, for example, such that the ink is separated into the solid component and the liquid component by using an ultrafiltration filter, and the liquid component is diluted with ultrapure water into an appropriate concentration to perform the inductive coupling plasma emission analysis (ICP).

The water base or aqueous ink medium, which is composed of water or a combination of water and a water-soluble organic solvent, is the medium to retain the pigment. Further, the medium give the characteristics as the ink. The medium includes at least water, a moistening agent, and a permeating agent.

The water, which is preferably usable in the present invention, includes pure water such as ion exchange water, water obtained by ultrafiltration, water obtained by reverse osmosis, and distilled water, and ultrapure water obtained by purification in a high degree by combining the pure water purification methods as described above. When water, which is sterilized by means of, for example, irradiation with ultraviolet light and addition of hydrogen peroxide, is used, it is possible to avoid the appearance of fungi and bacteria when the ink is stored for a long period, which is preferred.

In this case, the content of water is determined in a wide range depending on the type of other aqueous media, the composition thereof, and the desired characteristics of the ink. However, water is generally used within a range of 10 to 95% by weight and preferably 30 to 75% by weight with respect to the total weight of the ink.

The moistening agent, which is usable for the present invention, is selected from water-soluble materials having high moisture absorption. It is possible to use polyols such as glycerol, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, and pentaerythritol; lactams such as 2-pyrrolidone, N-methyl-2-pyrrolidone, and ε-caprolactam; urea-based compounds such as urea, thiourea, ethyleneurea, and 1,3-dimethylimidazolidinone; and sugars such as maltitol, sorbitol, gluconolactone, and maltose.

The moistening agent may be used singly, or the moistening agents may be used in a mixed manner, within a range of 1 to 50% by weight and preferably 1 to 30% by weight of the ink. In order to preferably use the ink when the ink is discharged by using the ink-jet printer, it is preferable that the moistening agent is added in such an amount of addition that the viscosity of the ink is not more than 10 cPs at 25° C. together with other ink additives.

The permeating agent, which is usable for the present invention, facilitates the permeation into the recording medium. The permeating agent is selected from surfactants and water-soluble organic solvents with which the surface tension of the aqueous solution is lowered.

The water-soluble organic solvent includes lower alcohols such as ethanol and propanol; cellosolves such as ethylene glycol monomethyl ether and ethylene glycol monoethyl ether; carbitols such as diethylene glycol monomethyl ether, diethylene glycol monoethyl ether, ethylene glycol monobutyl ether, diethylene glycol monobutyl ether, and triethylene glycol monobutyl ether; and 1,2-alkyldiols such as 1,2-hexanediol and 1,2-octanediol. The water-soluble organic solvent may be used singly, or the water-soluble organic solvents may be used in a mixed manner, within a range of 0.1 to 20% by weight and preferably 1 to 10% by weight of the ink.

Those usable as the surfactant include, for example, anionic surfactants such as fatty acid salts and alkyl sulfuric acid salts; nonionic surfactants such as polyoxyethylene alkyl ether and polyoxyethylene phenyl ether; acetylene glycol-based nonionic surfactants such as Surfynol 61, 82, 104, 440, 465, 485 (all trade names, produced by Air Products and Chemicals, Inc.); cationic surfactant; and amphoteric surfactants. It is preferable that the content of the surfactant in the ink to serve as the permeating agent is within a range of 0.1 to 5% by weight.

In order to more preferably use the water base pigment ink for ink-jet recording, the water-soluble organic solvent and the surfactant referred to above may be also used in combination.

Those usable as the pigment which can be utilized for the water base pigment ink for ink-jet recording of the present invention include inorganic pigments and organic pigments which have been hitherto used for the ink composition for ink-jet recording.

Those usable as the inorganic pigment include, for example, titanium-based pigment, red iron oxide, aluminum powder, talc, clay, calcium carbonate, silica, and carbon black.

Specifically, preferred carbon blacks, which are subjected to the surface-reforming treatment and which are of the self-dispersing type capable of spontaneously effecting the dispersion without any dispersing agent, include CAB-O-JET 200, 300 (produced by Cabot) and Bonjet Black CW1 (produced by Orient Chemical Industries, Ltd.). Those of the non-self-dispersing type include #20B, #40, and MA100 (all produced by Mitsubishi Chemical Corporation); Color Black FW18, Color Black S170, and Special Black 250 (all produced by Degussa); Conductex SC and Raven 1255 (all produced by Columbia Carbon); and Monarch 700, Monarch 880, and Elftex 12 (all produced by Cabot). These carbon blacks are described as examples of those to be preferably used for the present invention. The present invention is not limited thereto.

The organic pigment, which is preferably used in the present invention, includes, for example, azo pigments, phthalocyanine pigments, anthraquinone pigments, quinacridone pigments, thioindigo pigments, triphenylmethane lake pigments, and oxazine lake pigments. Further, it is also possible to use, for example, oil-soluble dyes and disperse dyes provided that they are insoluble in the aqueous medium. Specifically, yellow ones include C. I. Pigment Yellow 1, 2, 3, 4, 5, 6, 7, 10, 11, 12, 13, 14, 15, 16, 17, 65, 74, 83. Red ones include, for example, C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 122, 123, 163. Blue ones include, for example, C. I. Pigment Blue 2, 3, 15, 16, 22, 25. Black ones include, for example, C. I. Pigment Black 1, 7. Commercially available pigments include, for example, Fuji SP Yellow 4254, Fuji SP Magenta 9345, Fuji SP Blue 6447, Emacol SF Yellow H522F, Emacol SF Red J614F, and Emacol SF Blue H254F (all trade names, produced by Fuji Pigment Co., Ltd.).

In the water base pigment ink for ink-jet recording of the present invention, the pigment is preferably added within a range of 1 to 20% by weight with respect to the total amount of the ink. Within this range, it is possible to obtain the water base ink which provides a sufficient printing concentration.

When the pigment of the non-self-dispersing type is used, the liquid stability is further improved by using a dispersing agent in combination. The dispersing agent includes, for example, polymer dispersing agents which are exemplified by natural macromolecules and synthetic macromolecules.

Specifically, the natural macromolecule includes, for example, proteins such as glue, gelatin, casein, and albumin; natural rubbers such as gum arabic and gum traganth; glucoside such as saponin; alginic acid and alginic acid derivatives such as alginic acid propylene glycol ester, alginic acid triethanolamine, and alginic acid ammonium; and cellulose derivatives such as methyl cellulose, carboxymethyl cellulose, hydroxyethyl cellulose, and ethylhydroxyethyl cellulose.

Specifically, the synthetic polymer includes, for example, polyvinyl alcohols; polyvinylpyrrolidones; acrylic resins such as polyacrylic acid, acrylic acid-acrylonitrile copolymer, potassium acrylate-acrylonitrile copolymer, vinyl acetate-acrylic acid ester copolymer, and acrylic acid-acrylic acid alkyl ester copolymer; styrene-acrylic acid resins such as styrene-acrylic acid copolymer, styrene-methacrylic acid copolymer, styrene-methacrylic acid-acrylic acid alkyl ester copolymer, styrene-α-methylstyrene-acrylic acid copolymer, and styrene-α-methylstyrene-acrylic acid-acrylic acid alkyl ester copolymer; styrene-maleic acid; styrene-maleic anhydride; vinylnaphthalene-acrylic acid copolymer; vinylnaphthalene-maleic acid copolymer; vinyl acetate copolymers such as vinyl acetate-ethylene copolymer, vinyl acetate-fatty acid vinyl ethylene copolymer, vinyl acetate-maleic acid ester copolymer, vinyl acetate-crotonic acid copolymer, and vinyl acetate-acrylic acid copolymer; and salts of these compounds. Among them, it is especially preferable to use copolymer composed of monomer having hydrophobic group and monomer having hydrophilic group, and polymer composed of monomer having both of hydrophobic group and hydrophilic group.

The salt includes, for example, salts with diethylamine, ammonia, ethylamine, triethylamine, propylamine, isopropylamine, dipropylamine, butylamine, isobutylamine, triethanolamine, diethanolamine, aminomethylpropanol, and morpholine. The copolymer preferably has a weight average molecular weight of 3,000 to 30,000 and more preferably 5,000 to 15,000. The content of the dispersing agent to be used in the ink is within a range of 0.1 to 15% by weight.

The antiseptic/fungicidal agent, which is usable for the present invention, includes, for example, organic nitrogen-sulfur compounds represented by sodium 2-pyridinethiol-1-oxide, 5-chloro-2-methyl-4-isothiazoline-3-one, and 1,2-benzisothiazolin-3-one (commercially available compounds thereof include, for example, Proxel XL2S (trade name, produced by Avecia) and HF-53 (trade name, produced by Nagase Chemicals Ltd.)), sugars represented by mannitol and sorbitol, halogenated nitroalcohol derivatives, triazines, halogenated acetamides, p-chloro-m-xylenol, p-chloro-m-cresol, pyrithiones, sodium chloride, sodium benzoate, sodium propionate, sodium sorbate, sodium dehydroacetate, pentachlorophenol sodium salt, boric acid, sodium borate, 2-bromo-2-nitro-1,3-propanediol, 3-iodo-2-(propylvinyl) butyl carbamate, and benzalkonium chloride. However, the present invention is not limited thereto. The content of the antiseptic/fungicidal agent to be used in the ink is generally within a range of 0.1 to 2% by weight. However, in the case of the antiseptic/fungicidal agent, those which do not necessarily have high degree of purification are commercially available as compared with those based on aqueous media such as water, the moistening agent, and the permeating agent. Therefore, it is necessary to pay attention so that the free metal ion concentration in the ink adapts the contents of the present invention when the antiseptic/fungicidal agent is added to the ink.

In the case of the water base pigment ink for ink-jet recording of the present invention, no aggregation occurs even when the ink is left to stand for a long period, provided that the concentration of the free monovalent metal ion is not more than 300 ppm in total amount in the ink, and the concentration of the free divalent or polyvalent metal ion is not more than 5 ppm in total amount of the ink. It is possible to obtain the ink which is excellent in storage stability in which the clog-up is scarcely caused in the ink flow passage and the tip of the head of the ink-jet printer. The total amount of the free monovalent metal in the ink is preferably not more than 100 ppm and especially preferably not more than 50 ppm. The total amount of the free divalent or polyvalent metal in the ink is preferably not more than 3 ppm and especially preferably not more than 2 ppm.

It is necessary that the concentration of the free metal ion in the water base pigment ink for ink-jet recording is controlled to be a low concentration by using those having high degree of purification for the materials to be used for the ink.

The monovalent metal ion includes alkali metal ions of, for example, lithium, sodium, and potassium. The divalent or polyvalent metal ion includes alkaline-earth metal ions of, for example, magnesium, calcium, strontium, and barium; light metal ions of, for example, aluminum; and heavy metal ions of, for example, chromium, manganese, iron, nickel, copper, and zinc. However, if such ions are not liberated from the pigment even after being left to stand for a long period after being dispersed, for example, owing to the presence in the pigment or the strong adsorption to the pigment surface, the long-term storage stability of the ink is not affected thereby, even when the concentration of the monovalent metal ion contained in the ink exceeds about 300 ppm in total amount, or even when the concentration of the divalent or polyvalent metal ion exceeds about 5 ppm in total amount.

The concentration of the free monovalent metal ion and the concentration of the free divalent or polyvalent metal ion can be quantitatively measured, for example, in accordance with the following analytical method. The ink is separated into the solid component and the liquid component by using an ultrafiltration filter, the liquid component is diluted with ultrapure water to have an appropriate concentration for the measurement, and the concentration is obtained by performing the measurement by means of the inductive coupling plasma emission analysis (ICP).

Explanation will be specifically made below for Examples and Comparative Examples of the water base pigment ink for ink-jet recording of the present invention. Inks were prepared in accordance with the following procedure. However, the present invention is not limited thereto.

EXAMPLE 1

Inorganic Pigment Ink

A pigment dispersion liquid of Bonjet Black CW1 as the inorganic pigment (trade name, carbon black mill base produced by Orient Chemical Industries, Ltd., pigment content: 20% by weight) was desalted and purified by using an ultrafiltration membrane to adjust the pigment content so that the absorbance of the diluted aqueous solution of the same before the purification was the same as that after the purification. Twenty-five (25) g of the pigment dispersion liquid purified as described above, 20 g of glycerol as the moistening agent, 5 g of triethylene glycol monobutyl ether as the permeating agent, and 0.5 g of Proxel XL2S (trade name, produced by Avecia) as the antiseptic/fungicidal agent were mixed, to which ultrapure water was added so that the total amount was 100 g. The mixture liquid was agitated for 1 hour, followed by performing filtration with a membrane filter having a pore size of 5 μm to prepare a water base pigment ink for ink-jet recording. The composition is shown below.

Pigment: Bonjet Black CW1 solid content (desalted and purified): 5 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The liquid component was separated from the water base pigment ink by using a centrifugation type ultrafiltration unit, Microsep 10K (trade name, produced by Nippon Genetics Co., Ltd., molecular weight cut off: 10 K). The liquid component was diluted with ultrapure water to have a concentration suitable for the measurement, and the measurement was performed by using an inductive coupling plasma emission analyzer ICP-1000IV (produced by Shimadzu). As a result, the free monovalent metal ion was mainly sodium, and the concentration of the free monovalent metal ion was 100 ppm in total. Further, the free divalent or polyvalent metal ion was mainly calcium, and the concentration of the free divalent or polyvalent metal ion was 5 ppm in total.

Evaluation Method

The prepared water base pigment ink for ink-jet recording was evaluated in accordance with the following evaluation method.

(1) Aggregation Resistance

The filtratable ink amount was measured five times when the ink was filtrated under reduced pressure with an effective filtration area of 2.1 cm$^2$ under a condition of pressure reduction of −90 kPa by using Fujifilm microfilter (pore size: 5 μm, membrane filter, produced by Fuji Photo Film Co., Ltd.) and a filter holder for filtration under reduced pressure (produced by Toyo Roshi Kaisha, Ltd.). Obtained maximum and minimum values were excluded, and an average value of the remaining three values was used as "initial filtration amount". The filtratable ink amount was measured in the same manner as in the measurement of the initial filtration amount after storing inks of Examples and Comparative Examples at 60° C. for 2 weeks to obtain "filtration amount after left to stand" The degree of aggregation resistance was judged assuming that the sample, in which the ratio of "filtration amount after left to stand"/ "initial filtration amount" was not less than 80%, was indicated by "+", and the sample, in which the ratio was less than 80%, was indicated by "−" (shown in Table 1).

(2) Printing Stability

Printing was performed with the ink in accordance with the following two methods by using an ink-jet head of the shearing mode type as disclosed in Japanese Patent Application Laid-open No. 2-150355 to confirm the ink discharge performance. The case, in which the jetting was satisfactory and the printing was successfully performed without causing any clog-up at the tip of the ink-jet head in both of the methods, was indicated by "+", and the other cases were indicated by "−" (shown in Table 1).

2-1: confirmation of discharge stability: continuous discharge was performed for 24 hours in each of atmospheric temperatures of 5° C., 20° C., and 40° C.;

2-2: confirmation of discharge response: one minute intermittent discharge (repetition for 10 minutes of continuous discharge for 1 minute and pause for 1 minute) and discharge after being left to stand for 2 months were performed.

(3) Antiseptic/fungicidal Performance

Inks of Examples and Comparative Examples were stored at 60° C. for 2 weeks, followed by being left to stand at room temperature for one day. After that, obtained ink samples were used for evaluation. Food Stamp agar medium for viable microbe cell number and fungal cell number (trade name, produced by Nissui Pharmaceutical Co., Ltd.) was used. Designated microbes of JIS Z 2911 (test method for fungal resistance) were inoculated to the medium. The ink was dripped or added dropwise so that the entire medium was covered therewith, followed by being stored in a thermostatic incubator at 35° C. at a humidity of 95%. The case, in which colonies of bacteria and fungi did not appear until after 1 week, was indicated by "+", and the other cases were indicated by "−" (shown in Table 1).

Tested microbial strains: *Aspergillus niger* IFO 4407, *Chaelomium globosum* IFO 6347, *Cladosporium cladosporioides* IFO 6348, *Penicillium citrinum* IFO 7784, and *Rhizopus siolonifer* IFO 5411.

The water base pigment ink for ink-jet recording described in Example 1 has the composition containing the necessary amount of the antiseptic/fungicidal agent, in which the concentration of the total amount of the free monovalent metal ion in the ink is not more than 300 ppm, and the concentration of the total amount of the free divalent or polyvalent metal ion is not more than 5 ppm. An acceleration test, in which the ink was left to stand for 2 weeks in an environment of high temperature of 60° C., was performed in order to evaluate the time-dependent change of the ink. As for the ink after the acceleration test, both of the antiseptic/fungicidal performance and the aggregation resistance were satisfactory. Further, no clog-up was caused at the tip of the ink-jet head. The water base pigment ink for ink-jet recording had the satisfactory printing stability.

EXAMPLE 2

An ink was prepared by using a pigment dispersion liquid obtained by carrying out the desalting and purifying step for the pigment dispersion liquid in Example 1 for a period of time longer than that in Example 1. The ink was formulated in the same manner as in Example 1 except for the above. The composition is shown below.

Pigment: Bonjet Black CW1 solid content (additionally desalted and purified): 5 parts by weight;
Moistening agent: glycerol: 20 parts by weight;
Permeating agent: triethylene glycol-n-butyl ether: 5 parts by weight;
Antiseptic/fungicidal agent: Proxel XL2S: 0.5 parts by weight;
Ultrapure water: balance.

The concentration of the free metal ion in the ink was measured in accordance with the method described in Example 1. As a result, the free monovalent metal ion was mainly sodium, and the concentration of the free monovalent metal ion was 90 ppm in total. Further, the free divalent or polyvalent metal ion was mainly calcium, and the concentration of the free divalent or polyvalent metal ion was 2 ppm in total.

Comparative Example 1

An ink was prepared, in which Bonjet Black CW1 was used while being not purified, in the step of Example 1. The ink was formulated in the same manner as in Example 1 except for the above. The composition is shown below.

Pigment: Bonjet Black CW1 solid content (not purified): 5 parts by weight;
Moistening agent: glycerol: 20 parts by weight;
Permeating agent: triethylene glycol-n-butyl ether: 5 parts by weight;
Antiseptic/fungicidal agent: Proxel XL2S: 0.5 parts by weight;
Ultrapure water: balance.

The concentration of the free metal ion in the ink was measured in accordance with the method described in Example 1. As a result, the free monovalent metal ion was mainly sodium, and the concentration of the free monovalent metal ion was 110 ppm in total. Further, the free divalent or polyvalent metal ion was mainly calcium, and the concentration of the free divalent or polyvalent metal ion was 8 ppm in total.

Comparative Example 2

An ink was prepared, in which additionally desalted and purified Bonjet Black CW1 in Example 2 was used, and HF-53 (trade name, produced by Nagase Chemicals Ltd.) was used as the antiseptic/fungicidal agent in place of Proxel XL2S. The ink was formulated in the same manner as in Example 1 except for the above. The composition is shown below.

Pigment: Bonjet Black CW1 solid content (additionally desalted and purified): 5 parts by weight;
Moistening agent: glycerol: 20 parts by weight;
Permeating agent: triethylene glycol-n-butyl ether: 5 parts by weight;
Antiseptic/fungicidal agent: HF-53: 0.5 parts by weight;
Ultrapure water: balance.

The concentration of the free metal ion in the ink was measured in accordance with the method described in Example 1. As a result, the free monovalent metal ion was mainly sodium, and the concentration of the free monovalent metal ion was 370 ppm in total. Further, the free divalent or polyvalent metal ion was mainly calcium, and the concentration of the free divalent or polyvalent metal ion was 3 ppm in total.

EXAMPLE 3

Thirty-three (33) g of a pigment dispersion liquid of CAB-O-JET 300 as the inorganic pigment (trade name, carbon black mill base produced by Cabot, pigment content: 15% by weight), 20 g of glycerol as the moistening agent, 5 g of triethylene glycol monobutyl ether as the permeating agent, and 0.5 g of Proxel XL2S as the antiseptic/fungicidal agent (trade name, produced by Avecia) were mixed, to which ultrapure water was added so that the total amount was 100 g. The mixture liquid was agitated for 1 hour, followed by performing filtration with a membrane filter having a pore size of 5 μm to prepare a water base pigment ink for ink-jet recording. The composition is shown below.

Pigment: CAB-O-JET 300 solid content (not purified): 5 parts by weight;
Moistening agent: glycerol: 20 parts by weight;
Permeating agent: triethylene glycol-n-butyl ether: 5 parts by weight;
Antiseptic/fungicidal agent: Proxel XL2S: 0.5 parts by weight;
Ultrapure water: balance.

The concentration of the free metal ion in the ink was measured in accordance with the method described in Example 1. As a result, the free monovalent metal ion was mainly sodium, and the concentration of the free monovalent metal ion was 110 ppm in total. Further, the free divalent or polyvalent metal ion was mainly calcium, and the concentration of the free divalent or polyvalent metal ion was 2 ppm in total.

Comparative Example 3

An ink was prepared, in which sodium sorbate was used for only the antiseptic/fungicidal agent in place of Proxel XL2S in the step of Example 3. The ink was formulated in the same manner as in Example 3 except for the above. The composition is shown below.

Pigment: CAB-O-JET 300 solid content (not purified): 5 parts by weight;
Moistening agent: glycerol: 20 parts by weight;
Permeating agent: triethylene glycol-n-butyl ether: 5 parts by weight;
Antiseptic/fungicidal agent: sodium sorbate: 0.5 parts by weight;
Ultrapure water: balance.

The concentration of the free metal ion in the ink was measured in accordance with the method described in Example 1. As a result, the free monovalent metal ion was mainly sodium, and the concentration of the free monovalent metal ion was 950 ppm in total. Further, the free divalent or polyvalent metal ion was mainly calcium, and the concentration of the free divalent or polyvalent metal ion was 2 ppm in total.

EXAMPLE 4

Preparation of Pigment Dispersion Liquid

At first, a pigment dispersion liquid was prepared as follows. A liquid, which was obtained by adding 20 g of polyvinyl pyrrolidone (average molecular weight: 10000) as the dispersing agent, 200 g of glycerol as the moistening agent, and 340 g of ultrapure water, was mixed to dissolve the components. Fifty (50) g of carbon black MA100 (trade name, produced by Mitsubishi Chemical Corporation) was added thereto to perform pre-mixing. Subsequently, the mixture liquid was mixed and agitated for 1 hour with a bead mill, followed by performing filtration with a membrane filter having a pore size of 5 μm to obtain the pigment dispersion liquid.

Preparation of Ink

A mixture liquid, which was obtained by adding 61 g of the pigment dispersion liquid, 5 g of triethylene glycol monobutyl ether as the permeating agent, 0.5 g of Proxel XL2S as the antiseptic/fungicidal agent (trade name, produced by Avecia), and 33.5 g of ultrapure water, was agitated for 1 hour, followed by performing filtration with a membrane filter having a pore size of 5 µm to prepare a water base pigment ink for ink-jet recording. The composition is shown below.

Pigment: carbon black MA100 solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 20 ppm in total. Further, the free divalent or polyvalent metal ion was mainly calcium, and the concentration of the free divalent or polyvalent metal ion was 2 ppm in total.

EXAMPLE 5

An ink was prepared, in which HF-53 (trade name, produced by Nagase Chemicals Ltd.) was used for the antiseptic/fungicidal agent in place of Proxel XL2S in the step of Example 4. The ink was formulated in the same manner as in Example 4 except for the above. The composition is shown below.

Pigment: carbon black MA100 solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: HF-53: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 300 ppm in total. Further, the free divalent or polyvalent metal ion was mainly calcium, and the concentration of the free divalent or polyvalent metal ion was 3 ppm in total.

EXAMPLE 6

Organic Pigment Ink

A pigment dispersion liquid of Fuji SP Yellow 4254 as the organic pigment (trade name, mill base produced by Fuji Pigment Co., Ltd., pigment content: 12% by weight) was desalted and purified by using an ultrafiltration membrane. The pigment dispersion liquid was prepared and an ink was prepared in the same manner as in the step of Example 4. 0.5 g of Proxel XL2S (trade name, produced by Avecia) was used as the antiseptic/fungicidal agent. The composition is shown below.

Pigment: Fuji SP Yellow 4254 (desalted and purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 40 ppm in total. Further, the free divalent or polyvalent metal ion was mainly calcium, and the concentration of the free divalent or polyvalent metal ion was 4 ppm in total.

EXAMPLE 7

A pigment dispersion liquid of Fuji SP Magenta 9345 as the organic pigment (trade name, mill base produced by Fuji Pigment Co., Ltd., pigment content: 14% by weight) was desalted and purified by using an ultrafiltration membrane. The pigment dispersion liquid was prepared and an ink was prepared in the same manner as in the step of Example 4. 0.5 g of HF-53 (trade name, produced by Nagase Chemicals Ltd.) was used as the antiseptic/fungicidal agent. The composition is shown below.

Pigment: Fuji SP Magenta 9345 (desalted and purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: HF-53: 0.5 parts by

Ultrapure water: balance.

The concentration of the free metal ion in the ink was measured in accordance with the method described in Example 1. As a result, the free monovalent metal ion was mainly sodium, and the concentration of the free monovalent metal ion was 300 ppm in total. Further, the free divalent or polyvalent metal ion was mainly calcium, and the concentration of the free divalent or polyvalent metal ion was 3 ppm in total.

EXAMPLE 8

A pigment dispersion liquid of Fuji SP Blue 6447 as the organic pigment (trade name, mill base produced by Fuji Pigment Co., Ltd., pigment content: 18% by weight) was desalted and purified by using an ultrafiltration membrane. The pigment dispersion liquid was prepared and an ink was prepared in the same manner as in the step of Example 4. 0.5 g of Proxel XL2S (trade name, produced by Avecia) was used as the antiseptic/fungicidal agent. The composition is shown below.

Pigment: Fuji SP Blue 6447 (desalted and purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 20 ppm in total. Further, the free divalent or polyvalent metal ion was mainly calcium, and the concentration of the free divalent or polyvalent metal ion was 3 ppm in total.

EXAMPLE 9

A pigment dispersion liquid of Emacol SF Yellow H522F as the organic pigment (trade name, mill base produced by Fuji Pigment Co., Ltd., pigment content: 26% by weight) was desalted and purified by using an ultrafiltration membrane. The pigment dispersion liquid was prepared and an ink was prepared in the same manner as in the step of Example 4. 0.5 g of Proxel XL2S (trade name, produced by Avecia) was used as the antiseptic/fungicidal agent. The composition is shown below.

Pigment: Emacol SF Yellow H522F (desalted and purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 30 ppm in total. Further, the free divalent or polyvalent metal ion was mainly calcium, and the concentration of the free divalent or polyvalent metal ion was 3 ppm in total.

EXAMPLE 10

A pigment dispersion liquid of Emacol SF Red J614F as the organic pigment (trade name, mill base produced by Fuji Pigment Co., Ltd., pigment content: 19% by weight) was desalted and purified by using an ultrafiltration membrane. The pigment dispersion liquid was prepared and an ink was prepared in the same manner as in the step of Example 4. 0.5 g of HF-53 (trade name, produced by Nagase Chemicals Ltd.) was used as the antiseptic/fungicidal agent. The composition is shown below.

Pigment: Emacol SF Red J614F (desalted and purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: HF-53: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 290 ppm in total. Further, the free divalent or polyvalent metal ion was mainly calcium, and the concentration of the free divalent or polyvalent metal ion was 2 ppm in total.

EXAMPLE 11

A pigment dispersion liquid of Emacol SF Blue H524F as the organic pigment (trade name, mill base produced by Fuji Pigment Co., Ltd., pigment content: 26% by weight) was desalted and purified by using an ultrafiltration membrane. The pigment dispersion liquid was prepared and an ink was prepared in the same manner as in the step of Example 4. 0.5 g of HF-53 (trade name, produced by Nagase Chemicals Ltd.) was used as the antiseptic/fungicidal agent. The composition is shown below.

Pigment: Emacol SF Blue H524F (desalted and purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: HF-53: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 295 ppm in total. Further, the free divalent or polyvalent metal ion was mainly calcium, and the concentration of the free divalent or polyvalent metal ion was 5 ppm in total.

Comparative Example 4

A pigment dispersion liquid of Fuji SP Yellow 4254 as the organic pigment (trade name, mill base produced by Fuji Pigment Co., Ltd., pigment content: 12% by weight) was used while being not purified. The pigment dispersion liquid was prepared and an ink was prepared in the same manner as in the step of Example 4. 0.5 g of Proxel XL2S (trade name, produced by Avecia) was used as the antiseptic/fungicidal agent. The composition is shown below.

Pigment: Fuji SP Yellow 4254 (not purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 60 ppm in total. Further, the free divalent or polyvalent metal ion was mainly calcium, and the concentration of the free divalent or polyvalent metal ion was 12 ppm in total.

Comparative Example 5

A pigment dispersion liquid of Fuji SP Magenta 9345 as the organic pigment (trade name, mill base produced by Fuji Pigment Co., Ltd., pigment content: 14% by weight) was used while being not purified. The pigment dispersion liquid was prepared and an ink was prepared in the same manner as in the step of Example 4. 0.5 g of HF-53 (trade name, produced by Nagase Chemicals Ltd.) was used as the antiseptic/fungicidal agent. The composition is shown below.

Pigment: Fuji SP Magenta 9345 (not purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: HF-53: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 380 ppm in total. Further, the free divalent or polyvalent metal ion was mainly calcium, and the concentration of the free divalent or polyvalent metal ion was 5 ppm in total.

Comparative Example 6

A pigment dispersion liquid of Fuji SP Blue 6447 as the organic pigment (trade name, mill base produced by Fuji Pigment Co., Ltd., pigment content: 18% by weight) was used while being not purified. The pigment dispersion liquid was prepared and an ink was prepared in the same manner as in the step of Example 4. 0.5 g of Proxel XL2S (trade name, produced by Avecia) was used as the antiseptic/fungicidal agent. The composition is shown below.

Pigment: Fuji SP Blue 6447 (not purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 40 ppm in total. Further, the free divalent or polyvalent metal ion was mainly calcium, and the concentration of the free divalent or polyvalent metal ion was 7 ppm in total.

Comparative Example 7

A pigment dispersion liquid of Emacol SF Yellow H522F as the organic pigment (trade name, mill base produced by Fuji Pigment Co., Ltd., pigment content: 26% by weight) was used while being not purified. The pigment dispersion liquid was prepared and an ink was prepared in the same manner as in the step of Example 4. 0.5 g of Proxel XL2S (trade name, produced by Avecia) was used as the antiseptic/fungicidal agent. The composition is shown below.

Pigment: Emacol SF Yellow H522F (not purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: Proxel XL2S: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 50 ppm in total. Further, the free divalent or polyvalent metal ion was mainly calcium, and the concentration of the free divalent or polyvalent metal ion was 7 ppm in total.

Comparative Example 8

A pigment dispersion liquid of Emacol SF Red J614F as the organic pigment (trade name, mill base produced by Fuji Pigment Co., Ltd., pigment content: 19% by weight) was used while being not purified. The pigment dispersion liquid was prepared and an ink was prepared in the same manner as in the step of Example 4. 0.5 g of HF-53 (trade name, produced by Nagase Chemicals Ltd.) was used as the antiseptic/fungicidal agent. The composition is shown below.

Pigment: Emacol SF Red J614F (not purified) solid content: 5 parts by weight;

Dispersing agent: polyvinyl pyrrolidone (average molecular weight: 10000): 2 parts by weight;

Moistening agent: glycerol: 20 parts by weight;

Permeating agent: triethylene glycol-n-butyl ether: 5 parts by weight;

Antiseptic/fungicidal agent: HF-53: 0.5 parts by weight;

Ultrapure water: balance.

The concentration of the free metal ion in the ink was measured in accordance with the method described in Example 1. As a result, the free monovalent metal ion was mainly sodium, and the concentration of the free monovalent metal ion was 330 ppm in total. Further, the free divalent or polyvalent metal ion was mainly calcium, and the concentration of the free divalent or polyvalent metal ion was 3 ppm in total.

Results of Examples and Comparative Examples described above are summarized and shown in Tables 1 and 2.

TABLE 1

Inks Based on Use of Inorganic Pigments

| Example Co. Ex. | Pigment used (amount of addition: 5% by weight) | Antiseptic/ fungicidal agent: amount of addition (% by weight) | Free mono- valent metal ion concen- tration | Free poly- valent metal ion concen- tration | Aggre- gation resist- ance | Printing stability | Anti- septic/ fungicidal performance |
|---|---|---|---|---|---|---|---|
| Example 1 | purified CW1 | XL2S: 0.5% | 100 ppm | 5 ppm | + | + | + |

TABLE 1-continued

Inks Based on Use of Inorganic Pigments

| Example Co. Ex. | Pigment used (amount of addition: 5% by weight) | Antiseptic/ fungicidal agent: amount of addition (% by weight) | Free mono-valent metal ion concentration | Free poly-valent metal ion concentration | Aggregation resistance | Printing stability | Antiseptic/ fungicidal performance |
|---|---|---|---|---|---|---|---|
| Example 2 | purified CW1 (additionally purified) | XL2S: 0.5% | 90 ppm | 2 ppm | + | + | + |
| Example 3 | CAB-O-JET 300 | XL2S: 0.5% | 110 ppm | 2 ppm | + | + | + |
| Example 4 | MA100 | XL2S: 0.5% | 20 ppm | 2 ppm | + | + | + |
| Example 5 | MA100 | HF-53: 0.5% | 300 ppm | 3 ppm | + | + | + |
| Co. Ex. 1 | CW1 | XL2S: 0.5% | 110 ppm | 8 ppm | − | − | + |
| Co. Ex. 2 | purified CW1 (additionally purified) | HF-53: 0.5% | 370 ppm | 3 ppm | − | − | + |
| Co. Ex. 3 | CAB-O-JET 300 | sodium sorbate: 0.5% | 950 ppm | 2 ppm | − | − | + |

TABLE 2

Inks Based on Use of Organic Pigments

| Example Co. Ex. | Pigment used (amount of addition: 5% by weight) | Antiseptic/ fungicidal agent: amount of addition (% by weight) | Free mono-valent metal ion concentration | Free poly-valent metal ion concentration | Aggregation resistance | Printing stability | Antiseptic/ fungicidal performance |
|---|---|---|---|---|---|---|---|
| Example 6 | purified Fuji SP Yellow 4254 | XL2S: 0.5% | 40 | 4 | + | + | + |
| Example 7 | purified Fuji SP Magenta 9345 | HF-53: 0.5% | 300 | 3 | + | + | + |
| Example 8 | purified Fuji SP Blue 6447 | XL2S: 0.5% | 20 | 3 | + | + | + |
| Example 9 | purified Emacol SF Yellow H522F | XL2S: 0.5% | 30 | 3 | + | + | + |
| Example 10 | purified Emacol SF Red J614F | HF-53: 0.5% | 290 | 2 | + | + | + |
| Example 11 | Emacol SF Blue H524F | HF-53: 0.5% | 295 | 5 | + | + | + |
| Co. Ex. 4 | Fuji SP Yellow 4254 | XL2S: 0.5% | 60 | 12 | − | − | + |
| Co. Ex. 5 | Fuji SP Magenta 9345 | HF-53: 0.5% | 380 | 5 | − | − | + |
| Co. Ex. 6 | Fuji SP Blue 6447 | XL2S: 0.5% | 40 | 7 | − | − | + |
| Co. Ex. 7 | Emacol SF Yellow H522F | XL2S: 0.5% | 50 | 7 | − | − | + |
| Co. Ex. 8 | Emacol SF Red J614F | HF-53: 0.5% | 330 | 3 | − | − | + |

As shown in Tables 1 and 2, the filtration characteristic, which was not less than 80% of the initial one, was maintained even after the acceleration test in which the ink was left to stand for 2 weeks in the environment of high temperature of 60° C. in order to evaluate the time-dependent change of the ink, in each of Examples in which the concentration of the free monovalent metal ion was not more than 300 ppm in total in the ink, and the concentration of the free divalent or polyvalent metal ion was not more than 5 ppm in total. Accordingly, the aggregation resistance was satisfactory. Further, the printing stability after the storage of the ink was satisfactory. The water base pigment ink had the satisfactory storage stability, in which both of the aggregation resistance and the printing stability were simultaneously satisfied. Further, the antiseptic/fungicidal performance was maintained as well.

On the contrary, in the case of each of Comparative Examples not satisfying the foregoing condition, in which the concentration of the free monovalent metal ion exceeded 300 ppm or the concentration of the free divalent metal ion exceeded 5 ppm, the filtration characteristic of the ink was not more than 80% of the initial one after the acceleration test in which the ink was left to stand for 2 weeks in the environment of high temperature of 60° C., although the antiseptic/fungicidal performance was maintained. It was impossible to simultaneously satisfy the aggregation resistance and the printing stability, due to the printing failure caused, for example, by the clog-up at the tip of the ink-jet head. Especially, the concentration of the free polyvalent metal ion having a large number of ion valences conspicuously affected the aggregation resistance and the printing stability.

As clarified from the foregoing explanation, the water base pigment ink for ink-jet recording of the present invention is the water base pigment ink for ink-jet recording containing at least water and the pigment, in which the concentration of the free monovalent metal ion is not more than 300 ppm in total in the ink, and the concentration of the free divalent or polyvalent metal ion is not more than 5 ppm in total. Therefore, it is possible to provide the water base pigment ink for ink-jet recording in which the aggregation resistance is satisfactory, and the printing stability is satisfactory without causing any clog-up at the tip of the ink-jet head which will be explained below.

Further, the ink of the present invention has the antiseptic/fungicidal performance owing to the antiseptic/fungicidal agent contained therein. Furthermore, the concentration of the metal ion is not more than the above. Accordingly, it is possible to provide the water base pigment ink for ink-jet recording in which the aggregation resistance is satisfactory in the same manner as described above, and the printing stability is satisfactory without causing any clog-up at the tip of the ink-jet head.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples may be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
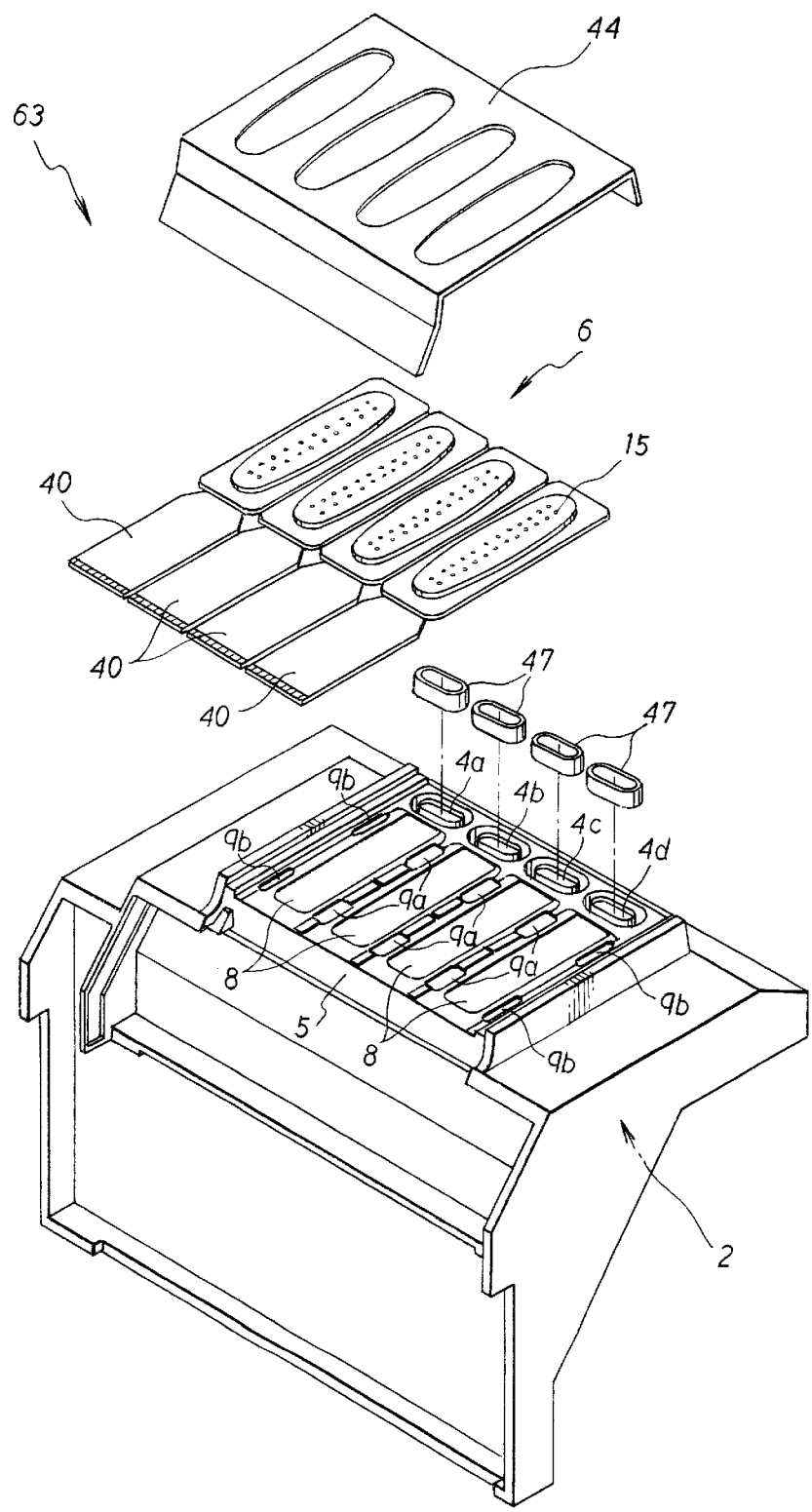
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
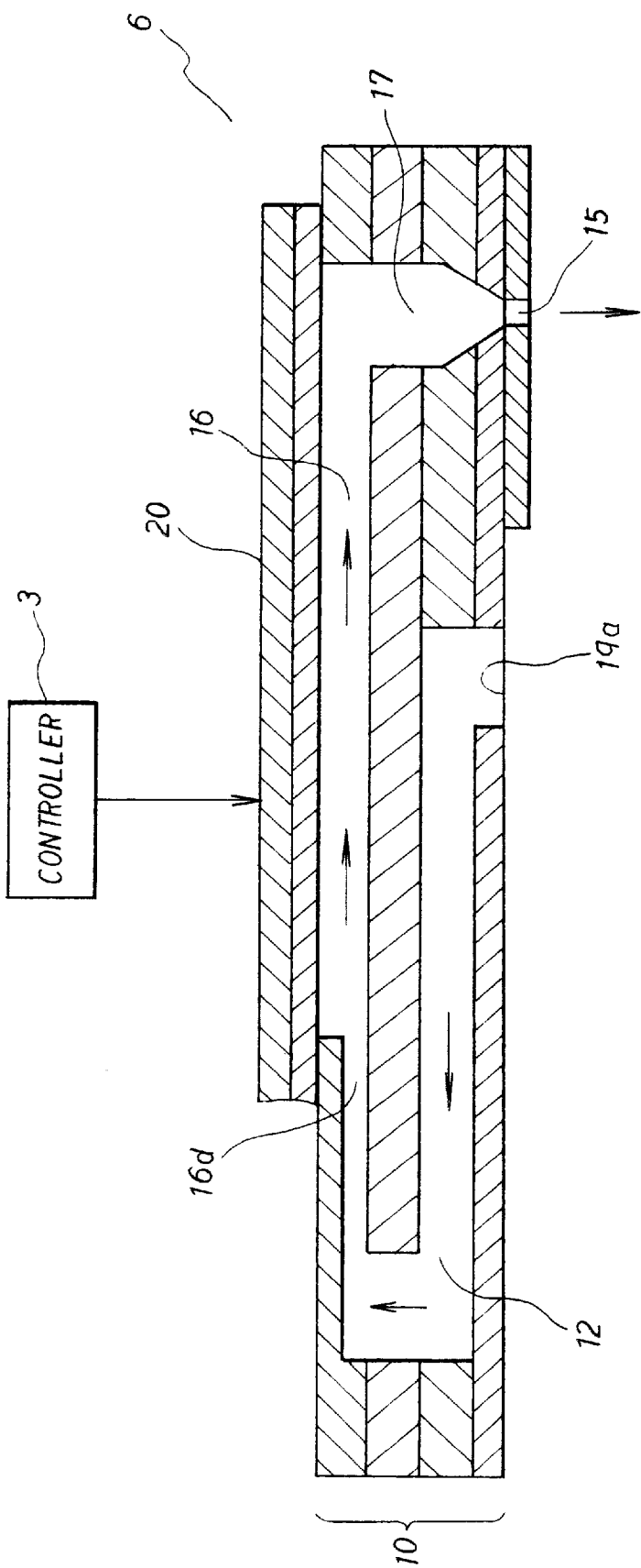
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 and 6,460,959. Further, the detailed structure of the printer and controlling method of the head unit are also disclosed in these U.S. patents, a content of which has been incorporated herein by reference.

What is claimed is:

1. An ink for ink-jet recording comprising:

water; and a pigment, wherein:

a total amount of free monovalent metal is not more than 300 ppm in the ink, and a total amount of free divalent or polyvalent metal is not more than 5 ppm in the ink.

2. The ink according to claim 1, wherein the total amount of the free monovalent metal is not more than 100 ppm in the ink.

3. The ink according to claim 1, wherein the total amount of the free divalent or polyvalent metal is not more than 3 ppm in the ink.

4. The ink according to claim 1, further comprising an antiseptic/fungicidal agent.

5. The ink according to claim 1, wherein the monovalent metal is sodium, and the divalent or polyvalent metal is calcium.

6. An ink-jet recording apparatus comprising:

an ink-jet head;

an ink tank which accommodates an ink to be supplied the ink-jet head; and the ink as defined in claim 1 which is accommodated in the ink tank.

7. The ink-jet recording apparatus according to claim 6 wherein the ink tank is an ink cartridge which is replaceable.

* * * * *